(12) United States Patent
Fukawa et al.

(10) Patent No.: US 11,480,244 B2
(45) Date of Patent: Oct. 25, 2022

(54) HEAT CONTROL DEVICE

(71) Applicant: ISUZU MOTORS LIMITED, Tokyo (JP)

(72) Inventors: Seiichiro Fukawa, Fujisawa (JP); Akihiro Urakami, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/756,698

(22) PCT Filed: Oct. 16, 2018

(86) PCT No.: PCT/JP2018/038545
§ 371 (c)(1),
(2) Date: Apr. 16, 2020

(87) PCT Pub. No.: WO2019/082747
PCT Pub. Date: May 2, 2019

(65) Prior Publication Data
US 2020/0240510 A1 Jul. 30, 2020

(30) Foreign Application Priority Data

Oct. 23, 2017 (JP) .............................. JP2017-204562

(51) Int. Cl.
*F01P 11/08* (2006.01)
*F01P 3/18* (2006.01)
(Continued)

(52) U.S. Cl.
CPC ............. *F16H 57/0413* (2013.01); *F01P 7/16* (2013.01); *F01P 3/18* (2013.01); *F01P 11/08* (2013.01);
(Continued)

(58) Field of Classification Search
CPC ... F01P 2060/045; F01P 11/08; F01P 2060/04
See application file for complete search history.

(56) References Cited

U.S. PATENT DOCUMENTS 6,772,715 B2 *  8/2004  Pfeffinger ................ F01P 7/16
                                                          123/41.31
10,132,403 B1 * 11/2018  Gooden .................... F01P 3/20
(Continued)

FOREIGN PATENT DOCUMENTS

CN      106246322 A    12/2016
JP      H11264318 A     9/1999
(Continued)

OTHER PUBLICATIONS

International Search Report and Written Opinion for related PCT App No. PCT/JP2018/038545 dated Dec. 25, 2018, 8 pgs. (partial translation).

(Continued)

*Primary Examiner* — Long T Tran
(74) *Attorney, Agent, or Firm* — Procopio, Cory, Hargreaves & Savitch LLP

(57) ABSTRACT

A heat control device (1) comprises: a radiator (12) that cools cooling water for cooling a vehicle engine (11); a transmission (13) that transmits the power generated at the engine (11); an air-cooling type oil cooler (14) that cools the transmission oil for cooling the transmission (13) by heat exchange with the air outside the vehicle; a water-cooling type oil cooler (15) that cools the transmission oil by heat exchange with the cooling water; and a flow path switching unit (16) that switches between causing the transmission oil to flow into the air-cooling type oil cooler (14), or causing the transmission oil to flow into the water-cooling type oil cooler (15).

10 Claims, 4 Drawing Sheets

(51) Int. Cl.
  *F16H 57/04* (2010.01)
  *F01P 7/16* (2006.01)
  *F28D 21/00* (2006.01)

(52) U.S. Cl.
  CPC ..... *F01P 2025/08* (2013.01); *F01P 2060/045* (2013.01); *F28D 2021/0089* (2013.01)

(56) References Cited

U.S. PATENT DOCUMENTS

| | | |
|---|---|---|
| 2002/0128107 A1 | 9/2002 | Wakayama |
| 2003/0217707 A1 | 11/2003 | Iwasaki |
| 2004/0204281 A1 | 10/2004 | Wakayama |
| 2006/0157000 A1* | 7/2006 | Lutze ................ F01P 7/162 123/41.44 |
| 2009/0101312 A1* | 4/2009 | Gooden ............ F16H 57/0413 165/104.19 |
| 2015/0059665 A1* | 3/2015 | Quix ................. F16H 57/0413 123/41.02 |
| 2016/0363038 A1 | 12/2016 | Kawamoto |

FOREIGN PATENT DOCUMENTS

| | | |
|---|---|---|
| JP | 2002266993 A | 9/2002 |
| JP | 2003-286845 A | 10/2003 |
| JP | 2004339989 A | 12/2004 |
| JP | 2008215434 A | 9/2008 |
| JP | 2010-065544 A | 3/2010 |
| KR | 20080004082 A | 1/2008 |

OTHER PUBLICATIONS

Notice of Reasons for Refusal for related JP App No. 2017-204562 dated Jun. 22, 2021, 10 pgs.
Chinese Patent Office, Office Action, Application No. CN201880068533.X, dated Sep. 1, 2022, in 11 pages.

* cited by examiner

[FIG. 1]
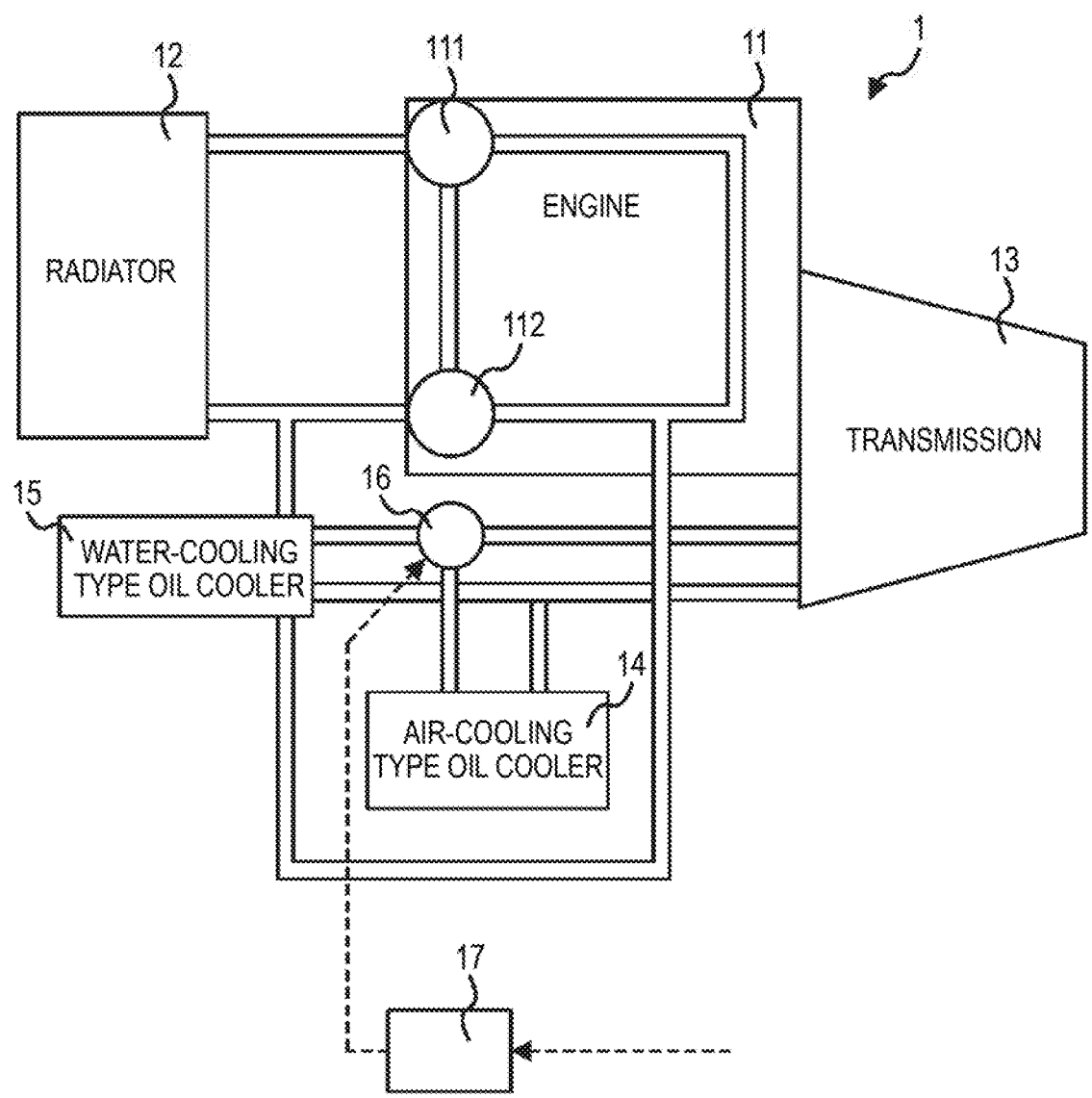

[FIG. 2]
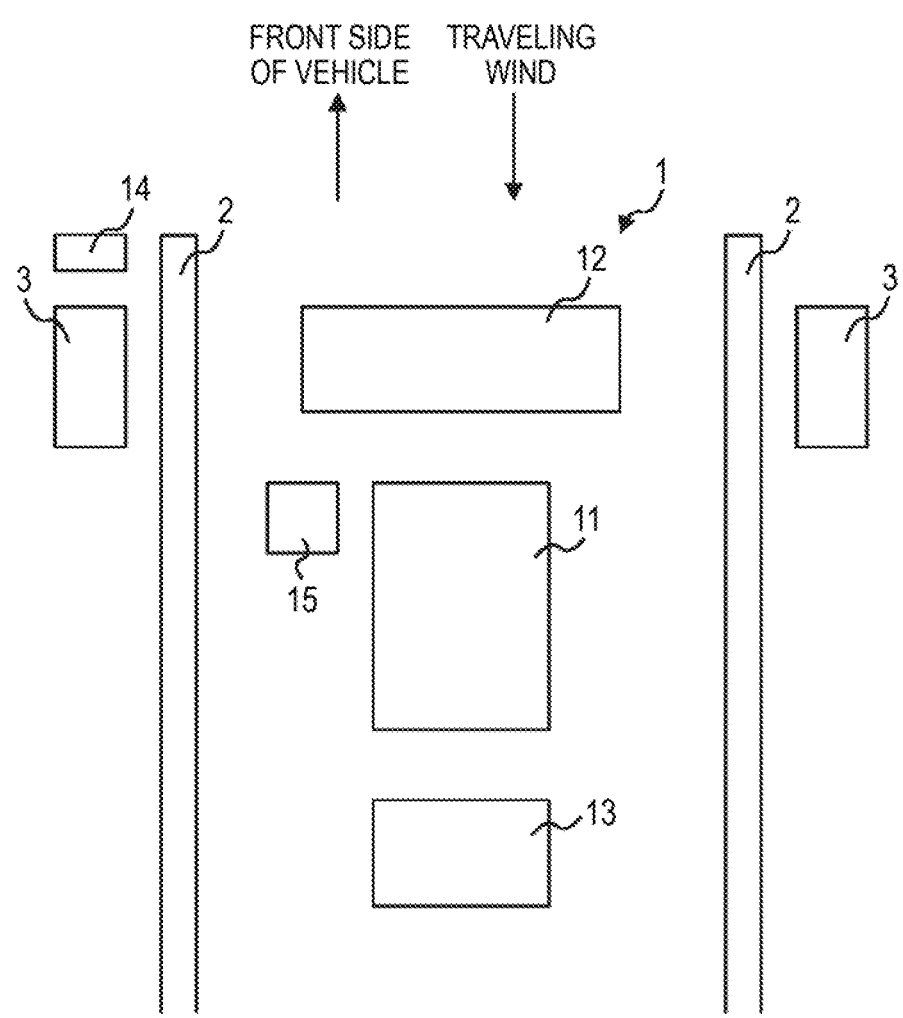

[FIG. 3]
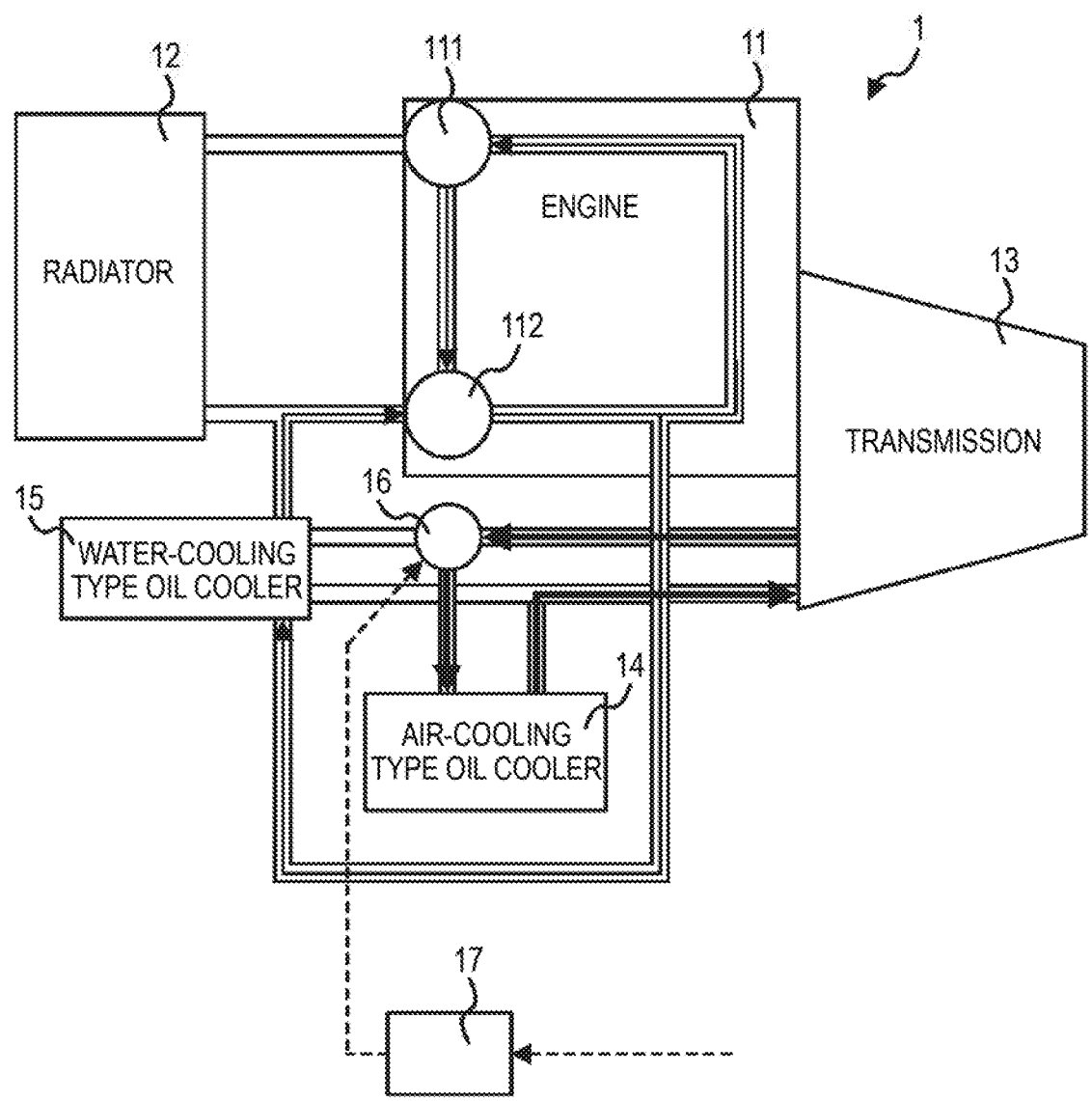

[FIG. 4]
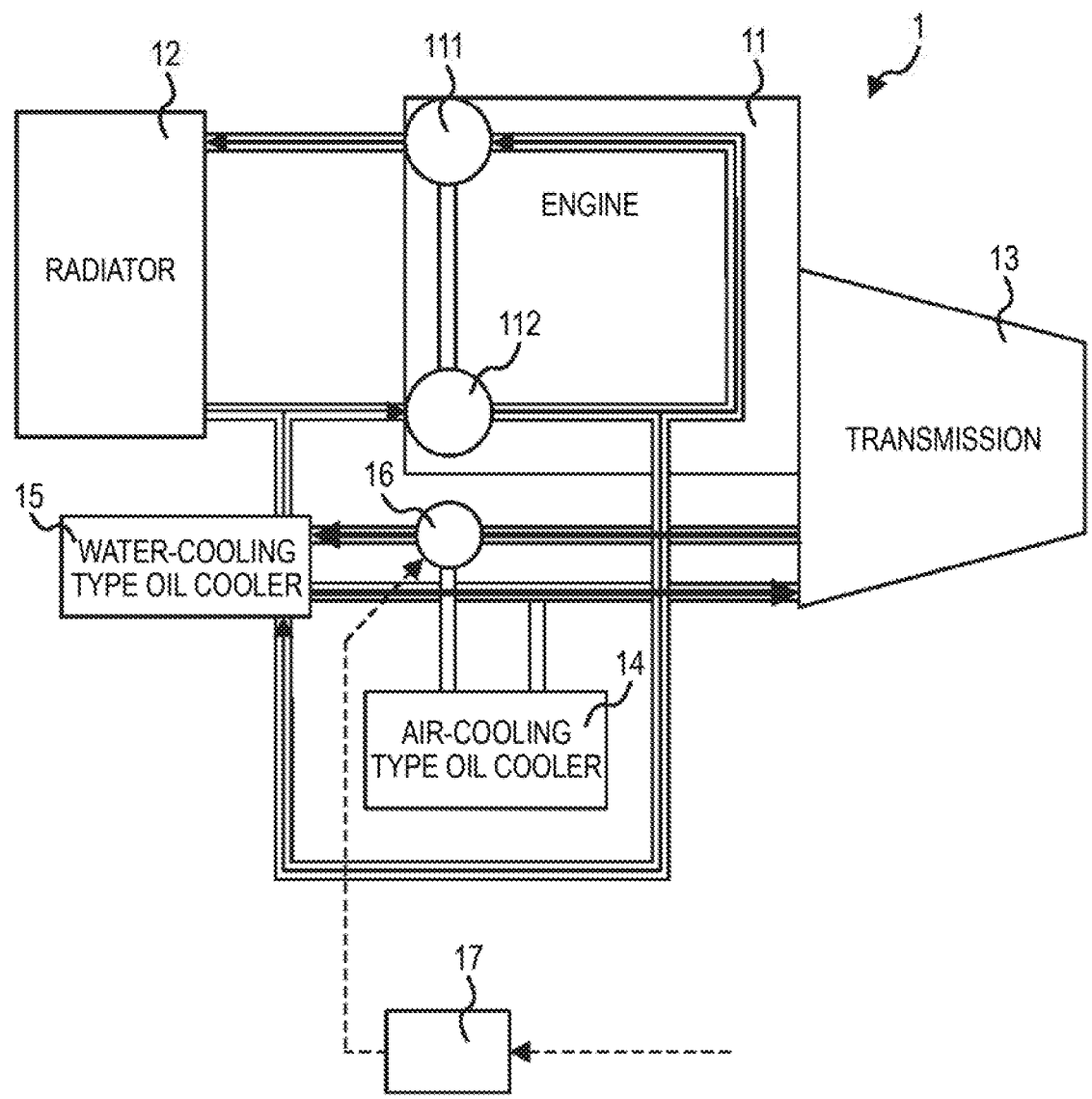

HEAT CONTROL DEVICE

CROSS-REFERENCE TO RELATED APPLICATIONS

This application is a U.S. National Stage entry of PCT Application No: PCT/JP2018/038545 filed on Oct. 16, 2018, which claims priority to Japanese Patent Application No. 2017-204562 filed Oct. 23, 2017, the contents of which are incorporated herein by reference.

TECHNICAL FIELD

The present disclosure relates to a heat control device that controls heat in a vehicle.

BACKGROUND ART

A heat control device is provided in a vehicle. PTL 1 discloses a configuration in which transmission oil is cooled by engine cooling water in a heat exchanger.

CITATION LIST

Patent Literature

PTL 1: JP-A-11-264318

SUMMARY OF INVENTION

Technical Problem

In the configuration in which the transmission oil is cooled by the engine cooling water in the heat exchanger, due to the state of the vehicle (for example, when the engine cooling water does not flow to the heat exchanger), the transmission oil cannot be cooled in the heat exchanger, and there has been a problem that the ability of cooling the transmission is reduced.

The present disclosure is made in view of the above circumstances, and an object thereof is to provide a heat control device that improves a cooling performance of cooling a transmission of a vehicle.

Solution to Problem

In a first aspect of the present disclosure, there is provided a heat control device, comprising: a radiator configured to cool cooling water for cooling an engine of a vehicle; a transmission configured to transmit power generated by the engine; an air-cooling type oil cooler configured to cool transmission oil for cooling the transmission by exchanging heat with air outside the vehicle; a water-cooling type oil cooler configured to cool the transmission oil by exchanging heat with the cooling water; and a flow path switching unit configured to switch between causing the transmission oil to flow into the air-cooling type oil cooler, or causing the transmission oil to flow into the water-cooling type oil cooler.

Furthermore, when the cooling water does not flow to the radiator, the flow path switching unit may be configured to cause the transmission oil to flow into the air-cooling type oil cooler. Also, the engine may include a thermostat configured to switch, based on a temperature of the cooling water, between causing the cooling water to flow into the radiator or causing the cooling water not to flow into the radiator, and in which the thermostat may be configured to cause the cooling water not to flow into the radiator when the temperature of the cooling water is lower than a first threshold value.

Furthermore, the heat control device may further comprise: a control unit configured to control to switch the flow path switching unit based on a state of the vehicle. Also, the control unit may be configured to cause the transmission oil flowing out of the transmission to flow into the air-cooling type oil cooler by operating the flow path switching unit when a temperature of the air outside the vehicle is lower than a second threshold value.

Furthermore, the control unit may be configured to cause the transmission oil flowing out of the transmission to flow into the air-cooling type oil cooler by operating the flow path switching unit when the vehicle is traveling. Also, the control unit may be configured to cause the transmission oil flowing out of the transmission to flow into the water-cooling type oil cooler by operating the flow path switching unit when a temperature of the cooling water is lower than a third threshold value.

Furthermore, the control unit may be configured to cause the transmission oil flowing out of the transmission to flow into the air-cooling type oil cooler and the water-cooling type oil cooler by operating the flow path switching unit when a temperature of the transmission oil is equal to or larger than a fourth threshold value.

Furthermore, the control unit may be configured to operate the flow path switching unit such that the transmission oil flows into the air-cooling type oil cooler when the cooling water is not flowing to the radiator, and the transmission oil flows into the water-cooling type oil cooler when the cooling water is flowing to the radiator.

Advantageous Effects of Invention

According to the present disclosure, the heat control device has an effect that the cooling performance of cooling the transmission of the vehicle can be improved.

BRIEF DESCRIPTION OF DRAWINGS

FIG. 1 shows a configuration of a heat control device according to the present embodiment.

FIG. 2 shows an example of a configuration of a vehicle provided with the heat control device according to the present embodiment.

FIG. 3 shows flows of cooling water and transmission oil when the cooling water does not flow to a radiator in the heat control device according to the present embodiment.

FIG. 4 shows flows of the cooling water and the transmission oil when the cooling water flows to the radiator in the heat control device according to the present embodiment.

DESCRIPTION OF EMBODIMENTS

Present Embodiment

Configuration of Heat Control Device 1 According to Present Embodiment

FIG. 1 is a diagram showing a configuration of a heat control device 1 according to the present embodiment. FIG. 2 is a diagram showing an example of a configuration of a vehicle provided with the heat control device 1 according to the present embodiment.

The vehicle has the heat control device 1, side frames 2, and tires 3. The heat control device 1 has a function of improving the cooling performance of cooling a transmission 13 of the vehicle. The side frames 2 are a plurality of members extending in a front-rear direction of the vehicle. The tires 3 are front wheels of the vehicle.

The heat control device 1 includes an engine 11, a radiator 12, the transmission 13, an air-cooling type oil cooler 14, a water-cooling type oil cooler 15, a flow path switching unit 16, and a control unit 17. The engine 11 generates power for driving the vehicle. The engine 11 is, for example, a diesel engine or a gasoline engine. The engine 11 has a thermostat 111 and a pump 112.

The thermostat 111 has a function of switching between causing the cooling water to flow into the radiator 12 or causing the cooling water not to flow into the radiator 12 based on the temperature of the cooling water. Specifically, the thermostat 111 has a function of adjusting a flow rate of the cooling water flowing from the engine 11 to the radiator 12 by opening and closing based on the temperature of the cooling water flowing inside the engine 11. The cooling water is a fluid that circulates between the engine 11 and the radiator 12. The cooling water is a fluid used for cooling the engine 11, and is, for example, a long life coolant (LLC).

Specifically, the thermostat 111 is closed when the temperature of the cooling water flowing inside the engine 11 is lower than a first threshold value. In this case, the cooling water does not flow from the engine 11 to the radiator 12. More specifically, as shown in FIG. 3, the cooling water circulates inside the engine 11 by flowing from the thermostat 111 toward the pump 112.

The thermostat 111 is opened when the temperature of the cooling water flowing inside the engine 11 is equal to or higher than the first threshold value. In this case, the cooling water flows from the engine 11 to the radiator 12. More specifically, as shown in FIG. 4, the cooling water flows from the thermostat 111 to the radiator 12, is cooled by the radiator 12, and then flows into the engine 11. The first threshold value may be set between 70 to 90° C. For example, the thermostat 111 may be opened when the temperature of the cooling water flowing inside the engine 11 is 80° C. or higher.

The pump 112 has a function of generating a force for flowing the cooling water. The cooling water circulates inside the engine 11 and flows by the operation of the pump 112.

The radiator 12 has a function of cooling the engine 11. The radiator 12 is an air-cooling type radiator. Specifically, the radiator 12 cools the cooling water by exchanging heat between cooling water heated by the engine 11 and air blown by traveling wind or a fan.

The transmission 13 has a function of transmitting power generated by the engine 11. Specifically, the transmission 13 transmits power generated by the engine 11 to, for example, a drive wheel. The transmission 13 includes, for example, an automated manual transmission (AMT) or a continuously variable transmission (CVT).

The air-cooling type oil cooler 14 cools transmission oil for cooling the transmission 13 by exchanging heat with air outside the vehicle. Specifically, the air-cooling type oil cooler 14 cools the transmission oil by exchanging heat between the transmission oil heated by the transmission 13 and air blown by traveling wind or a fan. The transmission oil is a fluid used for cooling the transmission 13. The transmission oil is, for example, an automatic transmission fluid (ATF). Specifically, the transmission oil cools heat generated in, for example, a fluid coupling unit, a torque converter unit, and a gear which are included in the transmission 13.

The water-cooling type oil cooler 15 cools the transmission oil by exchanging heat with the cooling water. Specifically, the water-cooling type oil cooler 15 cools the transmission oil by exchanging heat between the transmission oil heated by the transmission 13 and the cooling water cooled by the radiator 12.

The flow path switching unit 16 has a function of switching between causing the transmission oil to flow into the air-cooling type oil cooler 14, or causing the transmission oil to flow into the water-cooling type oil cooler 15. The flow path switching unit 16 is, for example, a three-way valve.

By operating the flow path switching unit 16, the transmission oil circulates between the transmission 13 and the air-cooling type oil cooler 14, or between the transmission 13 and the water-cooling type oil cooler 15. Specifically, by operating the flow path switching unit 16, the transmission oil flows through the transmission 13→the flow path switching unit 16→the air-cooling type oil cooler 14→the transmission 13 as shown in FIG. 3; or flows through the transmission 13→the flow path switching unit 16→the water-cooling type oil cooler 15→the transmission 13 as shown in FIG. 4.

The control unit 17 includes, for example, a central processing unit (CPU), a read only memory (ROM), and a random access memory (RAM). The control unit 17 controls the flow path switching unit 16 to switch based on the state of the vehicle. Specifically, the control unit 17 operates the flow path switching unit 16 depending on, for example, whether the cooling water is flowing to the radiator 12, or whether the cooling water is not flowing to the radiator 12, so that it is switched between causing the transmission oil to flow into the air-cooling type oil cooler 14, or causing the transmission oil to flow into the water-cooling type oil cooler 15.

As shown in FIG. 2, the radiator 12, the engine 11, and the transmission 13 are arranged in the vehicle in this order from front to rear in the front-rear direction of the vehicle. The air-cooling type oil cooler 14 is arranged, for example, in a front part of the vehicle and on an outer side of the plurality of side frames 2 in a vehicle width direction of the vehicle. Further, the water-cooling type oil cooler 15 is arranged near the engine 11.

[Flows of Cooling Water and Transmission Oil in Heat Control Device 1]

FIG. 3 is a diagram showing flows of the cooling water and the transmission oil when the cooling water does not flow to the radiator 12 in the heat control device 1 according to the present embodiment. FIG. 4 is a diagram showing flows of the cooling water and the transmission oil when the cooling water flows to the radiator 12 in the heat control device 1 according to the present embodiment.

As shown in FIG. 3, when the cooling water does not flow from the engine 11 to the radiator 12, the cooling water circulates inside the engine 11. Specifically, in this case, the thermostat 111 is in a closed state, and the cooling water circulates inside the engine 11 in the order of the engine 11→the thermostat 111→the pump 112→the engine 11. A part of the cooling water flowing out of the pump 112 flows through the water-cooling type oil cooler 15 and then flows into the pump 112. In this case, the cooling water does not flow to the radiator 12, and is not cooled by the radiator 12. Therefore, the cooling water flowing through the water-cooling type oil cooler 15 is in a high temperature state.

At this time, that is, when the cooling water does not flow to the radiator 12, the heat control device 1 causes the transmission oil to flow into the air-cooling type oil cooler 14 by operating the flow path switching unit 16. Specifically, in this case, the transmission oil circulates in the order of the transmission 13→the flow path switching unit 16→the air-cooling type oil cooler 14→the transmission 13. In this way, the transmission oil is cooled by the air-cooling type oil cooler 14, so that even when the cooling water does not flow from the engine 11 to the radiator 12, the transmission 13 can be sufficiently cooled.

As shown in FIG. 4, when the cooling water flows from the engine 11 to the radiator 12, the cooling water circulates between the engine 11 and the radiator 12. Specifically, in this case, the thermostat 111 is in an open state, and the cooling water circulates in the order of the engine 11→the thermostat 111→the radiator 12→the pump 112→the engine 11. A part of the cooling water flowing out of the pump 112 flows through the water-cooling type oil cooler 15 and then flows into the pump 112. In this case, the cooling water flows into the radiator 12, and is cooled by the radiator 12. The cooling water cooled by the radiator 12 flows into the water-cooling type oil cooler 15 before circulating in the engine 11. Therefore, the cooling water flowing through the water-cooling type oil cooler 15 is in a low temperature state.

At this time, that is, when the cooling water flows to the radiator 12, the transmission oil is caused to flow into the water-cooling type oil cooler 15 by operating the flow path switching unit 16. Specifically, in this case, the transmission oil circulates in the order of the transmission 13→the flow path switching unit 16→the water-cooling type oil cooler 15→the transmission 13. Therefore, the transmission oil is cooled by the water-cooling type oil cooler 15.

[Modification]

The control unit 17 may also cause the transmission oil flowing out of the transmission 13 to flow into the air-cooling type oil cooler 14 by operating the flow path switching unit 16 in a case where the temperature of the air outside the vehicle is lower than a second threshold value, for example. The temperature of the air outside the vehicle is measured by, for example, a temperature measurement unit provided to protrude from an outside surface of the vehicle. The second threshold value is determined based on, for example, the temperature of the cooling water, and is a temperature at which it can be determined that the air-cooling type oil cooler 14 has higher cooling performance than the water-cooling type oil cooler 15. In this way, it is possible to prevent the transmission oil from flowing into the water-cooling type oil cooler 15 even though the transmission oil cannot be cooled by the water-cooling type oil cooler 15.

The control unit 17 may also cause the transmission oil flowing out of the transmission 13 to flow into the air-cooling type oil cooler 14 by operating the flow path switching unit 16 in a case where the vehicle is traveling, for example. Whether the vehicle is traveling or not is notified to the control unit 17 of speed information measured by a speedometer provided in the vehicle, and the control unit 17 determines by using the notified speed information. While the vehicle is traveling, the cooling effect of the air-cooling type oil cooler 14 is better, and thus the transmission oil can be cooled effectively.

The control unit 17 may also cause the transmission oil flowing out of the transmission 13 to flow into the water-cooling type oil cooler 15 by operating the flow path switching unit 16 in a case where the temperature of the cooling water is lower than a third threshold value. The temperature of the cooling water is measured by, for example, a temperature measurement unit provided near an outlet of the engine 11. The third threshold value is determined based on, for example, the temperature of the cooling water, and is a temperature at which it can be determined that the water-cooling type oil cooler 15 has higher cooling performance than the air-cooling type oil cooler 14. In this way, it is possible to prevent the transmission oil from flowing into the air-cooling type oil cooler 14 even though the transmission oil cannot be cooled by the air-cooling type oil cooler 14.

The control unit 17 may cause the transmission oil flowing out of the transmission 13 to flow into the air-cooling type oil cooler 14 and the water-cooling type oil cooler 15 by operating the flow path switching unit 16 in a case where the cooling performance is insufficient, and for example, the temperature of the transmission oil is equal to or higher than a fourth threshold value. The temperature of the transmission oil is measured by, for example, a temperature measurement unit provided near an outlet of the transmission 13. The fourth threshold value is determined based on, for example, the temperature of the transmission oil, and is a temperature at which it can be determined that the transmission oil cannot be sufficiently cooled with the cooling performance of either the air-cooling type oil cooler 14 or the water-cooling type oil cooler 15. In this way, the transmission oil can be cooled effectively.

In the above embodiment, the engine 11 has the thermostat 111 and the pump 112, but is not limited thereto. The thermostat 111 may be provided between the engine 11 and the radiator 12, for example, near an inlet of the radiator 12, and the pump 112 may be provided between the engine 11 and the radiator 12, for example, near an inlet of the engine 11.

Effects of Heat Control Device 1 According to Present Embodiment

The heat control device 1 according to the present embodiment includes the radiator 12 that cools the cooling water for cooling the engine 11 of the vehicle, the transmission 13 that transmits the power generated by the engine 11, the air-cooling type oil cooler 14 that cools the transmission oil for cooling the transmission 13 by exchanging heat with the air outside the vehicle, and the water-cooling type oil cooler 15 that cools the transmission oil by exchanging heat with the cooling water. The heat control device 1 further includes the flow path switching unit 16 that switches between causing the transmission oil to flow into the air-cooling type oil cooler 14, or causing the transmission oil to flow into the water-cooling type oil cooler 15.

The heat control device 1 according to the present embodiment thus has the air-cooling type oil cooler 14 and the water-cooling type oil cooler 15 to cool the transmission oil for cooling the transmission 13, and can switch whether the transmission oil flows into the air-cooling type oil cooler 14 or the water-cooling type oil cooler 15. Therefore, according to the state of the vehicle, the heat control device 1 can switch between the air-cooling type oil cooler 14 and the water-cooling type oil cooler 15, which are different types, and use an oil cooler having higher cooling performance.

As a result, the heat control device 1 can improve the cooling performance of cooling the transmission 13. Further, the heat control device 1 has two oil coolers for cooling the transmission 13, and the size of each oil cooler can be reduced, so that the degree of freedom in providing the oil cooler in the vehicle is improved.

The present invention has been described using the embodiment, but the technical scope of the present invention is not limited to the scope described in the embodiment described above, and various modifications and changes can be made within the scope thereof. For example, a specific embodiment of distributing and integrating devices is not limited to the above embodiment and all or a part thereof may be configured to be functionally or physically distributed and integrated in any unit. In addition, new embodiments generated by any combination of a plurality of embodiments are also contained in the embodiment of the present invention. Effects of the new embodiments generated from the combinations include effects of the original embodiments.

The present application is based on Japanese Patent Application No. 2017-204562 filed on Oct. 23, 2017, contents of which are incorporated herein as reference.

INDUSTRIAL APPLICABILITY

The present invention has an effect that a cooling performance of cooling a transmission of a vehicle can be improved, and is useful for a heat control device or the like.

REFERENCE SIGNS LIST

1: Heat control device
11: Engine
111: Thermostat
112: Pump
12: Radiator
13: Transmission
14: Air-cooling type oil cooler
15: Water-cooling type oil cooler
16: Flow path switching unit
17: Control unit
2: Side frame
3: Tire

The invention claimed is:

1. A heat control device, comprising:
a radiator configured to cool cooling water for cooling an engine of a vehicle;
a transmission configured to transmit power generated by the engine;
an air-cooling type oil cooler configured to cool transmission oil for cooling the transmission by exchanging heat with air outside the vehicle;
a water-cooling type oil cooler configured to cool the transmission oil by exchanging heat with the cooling water;
a flow path switch configured to switch between causing the transmission oil to flow into the air-cooling type oil cooler, or causing the transmission oil to flow into the water-cooling type oil cooler; and
a controller configured to control to switch the flow path switch based on a state of the vehicle,
wherein, in response to the cooling water not flowing to the radiator, the controller is configured to operate the flow path switch to:
cause the cooling water not to flow to the air-cooling type oil cooler; and
cause the transmission oil to flow into the air-cooling type oil cooler, and wherein, in response to the cooling water flowing to the radiator, the controller is configured to operate the flow path switch to:
cause the cooling water not to flow to the air-cooling type oil cooler; and
cause the transmission oil to flow into the water-cooling type oil cooler.

2. The heat control device according to claim 1, wherein the engine includes a thermostat configured to switch, based on a temperature of the cooling water, between causing the cooling water to flow into the radiator or causing the cooling water not to flow into the radiator, and
wherein the thermostat is configured to cause the cooling water not to flow into the radiator when the temperature of the cooling water is lower than a first threshold value.

3. The heat control device according to claim 1, wherein the controller is configured to cause the transmission oil flowing out of the transmission to flow into the air-cooling type oil cooler by operating the flow path switch when a temperature of the air outside the vehicle is lower than a second threshold value.

4. The heat control device according to claim 1, wherein the controller is configured to cause the transmission oil flowing out of the transmission to flow into the air-cooling type oil cooler by operating the flow path switch when the vehicle is traveling.

5. The heat control device according to claim 1, wherein the controller is configured to cause the transmission oil flowing out of the transmission to flow into the water-cooling type oil cooler by operating the flow path switch when a temperature of the cooling water is lower than a third threshold value.

6. The heat control device according to claim 1, wherein the controller is configured to cause the transmission oil flowing out of the transmission to flow into the air-cooling type oil cooler and the water-cooling type oil cooler by operating the flow path switch when a temperature of the transmission oil is equal to or larger than a fourth threshold value.

7. The heat control device according claim 1, wherein the controller is configured to operate the flow path switch such that the transmission oil flows into the air-cooling type oil cooler when the cooling water is not flowing to the radiator, and the transmission oil flows into the water-cooling type oil cooler when the cooling water is flowing to the radiator.

8. The heat control device according to claim 1, further comprising a pump,
wherein a part of the cooling water, flowing out of the pump, flows through the water-cooling type oil cooler before circulating in the engine and then flows into the pump.

9. A heat control device, comprising:
a radiator configured to cool cooling water for cooling an engine of a vehicle;
a transmission configured to transmit power generated by the engine;
an air-cooling type oil cooler configured to cool transmission oil for cooling the transmission by exchanging heat with air outside the vehicle;
a water-cooling type oil cooler configured to cool the transmission oil by exchanging heat with the cooling water;
a flow path switching unit configured to switch between causing the transmission oil to flow into the air-cooling type oil cooler, or causing the transmission oil to flow into the water-cooling type oil cooler; and a control unit configured to control to switch the flow path switching unit based on a state of the vehicle, wherein, in response to the cooling water not flowing to the radiator, the control unit is configured to operate the flow path switching unit to:

cause the cooling water not to flow to the air-cooling type oil cooler; and cause the transmission oil to flow into the air-cooling type oil cooler, and wherein, in response to the cooling water flowing to the radiator, the controller is configured to operate the flow path switch to:

cause the cooling water not to flow to the air-cooling type oil cooler; and cause the transmission oil to flow into the water-cooling type oil cooler.

10. A vehicle comprising:

a side frame;

an engine;

a transmission configured to transmit power generated by the engine; and a heat control device comprising:

a radiator arranged in a front part of the vehicle and configured to cool cooling water for cooling the engine;

an air-cooling type oil cooler arranged on an outer side of the side frame and configured to cool transmission oil for cooling the transmission by exchanging heat with air outside the vehicle;

a water-cooling type oil cooler configured to cool the transmission oil by exchanging heat with the cooling water;

a flow path switch configured to switch between causing the transmission oil to flow into the air-cooling type oil cooler, or causing the transmission oil to flow into the water-cooling type oil cooler; and a controller configured to control to switch the flow path switch based on a state of the vehicle, wherein, in response to the cooling water not flowing to the radiator, the controller is configured to operate the flow path switch to:

cause the cooling water not to flow to the air-cooling type oil cooler; and cause the transmission oil to flow into the air-cooling type oil cooler, and wherein, in response to the cooling water flowing to the radiator, the controller is configured to operate the flow path switch to:

cause the cooling water not to flow to the air-cooling type oil cooler; and cause the transmission oil to flow into the water-cooling type oil cooler.

* * * * *